United States Patent
Kumar et al.

(10) Patent No.: US 8,194,976 B2
(45) Date of Patent: Jun. 5, 2012

(54) MACHINE READABLE DOCUMENTS AND READING METHODS

(75) Inventors: Anil Kumar, Bloomingon, IN (US); Srinivasan Ramani, Karnataka (IN); Darpan Goel, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 926 days.

(21) Appl. No.: 12/234,720

(22) Filed: Sep. 22, 2008

(65) Prior Publication Data

US 2009/0103803 A1   Apr. 23, 2009

(30) Foreign Application Priority Data

Oct. 22, 2007   (IN) .............................. 2389/CHE/2007

(51) Int. Cl.
  *G06K 9/36*   (2006.01)

(52) U.S. Cl. ...................................... 382/166

(58) Field of Classification Search ................. 382/100, 382/166, 232, 274, 243; 235/454
See application file for complete search history.

(56) References Cited

U.S. PATENT DOCUMENTS

| | | |
|---|---|---|
| 5,221,833 A | 6/1993 | Hecht |
| 5,870,510 A | 2/1999 | Hecht |
| 5,937,110 A | 8/1999 | Petrie et al. |
| 5,949,055 A | 9/1999 | Fleet et al. |
| 6,000,613 A | 12/1999 | Hecht et al. |
| 6,081,345 A | 6/2000 | Curry |
| 6,092,732 A | 7/2000 | Curry |
| 7,089,420 B1 | 8/2006 | Durst et al. |
| 7,152,047 B1 | 12/2006 | Nagel |
| 2002/0085759 A1 | 7/2002 | Davies et al. |
| 2006/0074980 A1 | 4/2006 | Sarkar |
| 2006/0255141 A1 | 11/2006 | Kocis et al. |

*Primary Examiner* — Duy M Dang

(57) ABSTRACT

A method of independently encoding an image with two information channels comprises generating an image which encodes a primary information channel based on brightness levels. The image is modified to encode a secondary information channel. This image modification comprises applying one of two image output values to the image portion, wherein the brightness of a modified image portion is not changed such as to change the primary information channel encoding.

18 Claims, 3 Drawing Sheets

MACHINE READABLE DOCUMENTS AND READING METHODS

RELATED APPLICATIONS

Benefit is claimed under 35 U.S.C. 119(a)-(d) to Foreign application Ser No. 2389/CHE/2007 entitled "MACHINE READABLE DOCUMENTS AND READING METHODS" by Hewlett-Packard Development Company, L.P., filed on 22 Oct. 2007, which is herein incorporated in its entirety by reference for all purposes

BACKGROUND OF THE INVENTION

This invention relates to machine readable documents and reading methods, and in particular relates to a method for embedding machine readable data in a document.

Paper documents constitute the fundamental medium for distribution of information. They are economical, easy to use and ubiquitous. While networks of electronically stored documents play a valuable role in modern business, the continuing role of paper documents cannot be denied.

A large number of paper documents are issued and processed by enterprises and government units every year.

To facilitate easy movement of information from an electronic record to paper and back, it is possible to print machine readable data on paper documents. For instance, barcodes are commonly used for encoding machine readable data on paper as they offer high data density and incorporate error correction techniques.

Machine readable data can be affixed to documents in a number of ways depending on factors such as target data density, ruggedness and aesthetic requirements of the document. Appending 2D barcodes such as PDF417 barcodes to a document is a well known technique for offering machine readability to paper documents. The PDF417 (portable data file 417) format is a stacked linear bar code symbol used in a variety of applications, including transport, identification cards, and inventory management.

However, several of the known techniques require the division of the paper document into two parts: one part for the human readable material exclusively and the other for machine readable data. Each part of the paper document can thereby carry only one channel of information. Restricting machine readable data to a small and separate area reduces the data carrying capacity.

Another technique for embedding data on paper is to print low density machine readable markings over the entire printable area of the paper and superimpose human readable material on the machine readable marking.

BRIEF DESCRIPTION OF THE DRAWINGS

Examples of the invention will now be described in detail with reference to the accompanying drawings, in which.

DETAILED DESCRIPTION

Figure 1:
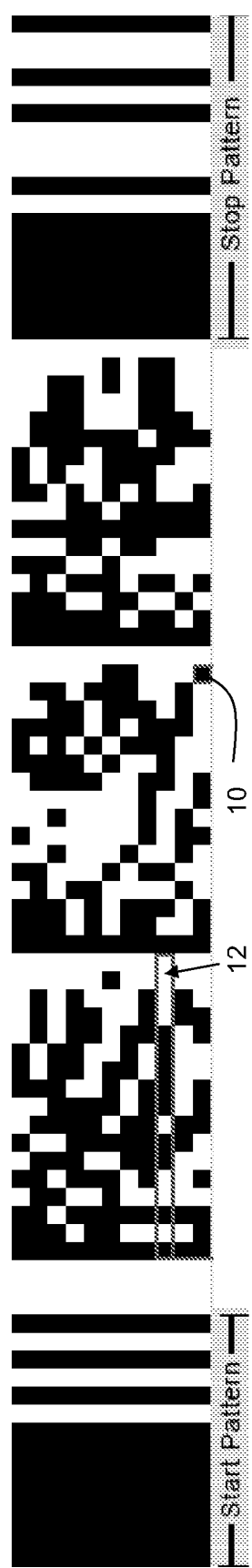
FIG. 1 shows a known barcode image.

Examples of the invention relate to a method of encoding a secondary channel, without disturbing a primary channel, which primary channel may for example be in the form of a 2D barcode. The secondary encoding can use color, brightness levels, patterns or any other decodable image effect which does not alter the encoding effect used by the primary channel so much that the primary channel cannot be decoded.

In an example, a method of independently encoding an image with two information channels comprises generating an image which encodes a primary information channel, the image comprising image portions, wherein the image portions are generated as an image portion with brightness above a first threshold, or as an image portion with brightness below a second threshold, the brightness levels encoding the primary information channel. The primary information channel is thus encoded based on brightness level, and this is the case for barcodes as well as human readable text.

The image is modified to encode a secondary information channel, wherein the image modification is applied to at least some of the image portions and comprises applying one of two image output values to the image portion, wherein the brightness of a modified image portion is not changed such as to cross the first or second thresholds. This means the encoding of the primary information channel is not disturbed. The image output values are used to encode the secondary information channel.

The secondary channel may provide useful but non-critical information, whereas the primary channel can be considered to carry critical data.

In a first example, the primary channel is machine readable, and it is then designed for conforming with widely available standards, and the introduction of the secondary channel does not disturb any standards used to create the primary information channel. For example, if the primary channel is machine readable data such as a PDF417 2D barcode, the secondary channel must not render the PDF417 undecodeable by existing implementations of PDF417 decoders.

In a second example, the primary channel is human-readable. The introduction of a secondary computer readable channel must not precent readability of the primary information channel.

In preferred examples, the primary channel does not use the same color as the secondary channel.

Thus, in each case, the secondary channel must not interfere with the primary channel. This technique offers significant improvements over the basic technique of using 2D barcodes in a part of the paper area, specially set apart for the purpose, to create a data channel.

When the primary information channel, consisting of either human readable material or machine readable data is printed on paper, it creates a bitmap. This bitmap can be thought of as a grid of pixels of varying luminance and/or chrominance.

Typically, the background (plain white paper) will have a high luminance component while the printed matter (black ink/toner) will have a low luminance component. This combination of white and black comprises the primary channel, which can be either text or a machine readable code.

A first example of embedding a secondary channel in a machine readable primary channel is now explained with reference to FIG. 1.

FIG. 1 shows a PDF417 barcode, which comprises the primary channel. It consists of a number of Barcode Elements 10, which comprise a single block of color. In the example shown, 17 of these Barcode Elements (which are either black or white) in a row form a codeword 12. Start and end portions are also shown.

These codewords extend horizontally, and are stacked in the vertical direction to form the complete barcode.

Figure 2:
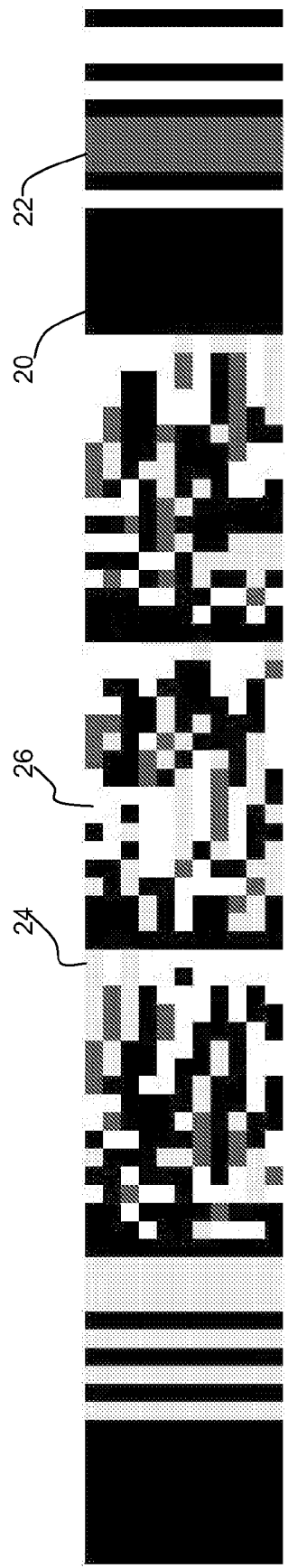
FIG. 2 shows a first example of image generated using an example of method of the invention.

By adding a secondary channel to the barcode in FIG. 1, the pattern shown in FIG. 2 is obtained.

This pattern comprises four colors: black (for example at 20), brown (for example at 22), yellow (for example at 24) and white (for example at 26). Of course, only different shades of grey can be seen in FIG. 2.

Figure 3:
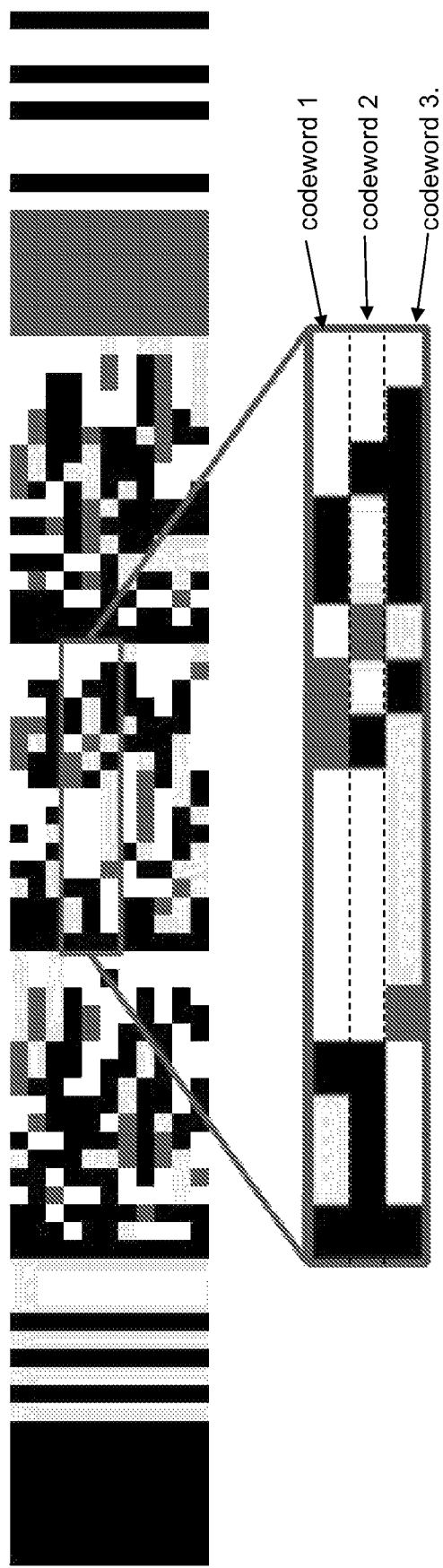
FIG. 3 is used to explain how two information channels are encoded in the image of FIG. 2.

The different shades of grey, corresponding to the different colors, can be seen more clearly in FIG. 3, which includes an enlarged portion, clearly showing the white, light grey, dark grey and black regions, corresponding to white, yellow, brown and black.

A typical PDF417 barcode, such as the one in FIG. 1, consists of high luminance (white) and low luminance (black) components. The barcode contained in FIG. 2 can be approximated to a PDF417 barcode as it contains two luminance components: the white and yellow components are high luminance and the black and brown components are low luminance.

Therefore, in order to decode the primary channel, the decoder approximates the yellow to white, and approximates the brown to black, and decodes the PDF417 barcode. Barcode readers handling the standard formats such as PDF417 ignore the luminance differences used to create the secondary channel and thus reliably recover the information encoded in the primary channel.

Thus, it can be seen that in order to encode the secondary channel, the distribution of the high luminance and low luminance pixels is exploited. The luminance component of high luminance white pixels can be slightly lowered with a moderate luminance color (such as yellow) to encode information. At the same time the luminance of low luminance black pixels can be slightly increased (such as brown). By altering the luminance component of pixels within reasonable margins, the pixels can be effectively modulated to carry the secondary channel.

There is a trade off in the luminance chosen to create the secondary channel. If the luminance is too high or too low, it maybe hard to differentiate between the primary channel and the secondary channel.

In an example, the decoding of the secondary channel does not depend upon luminance but on hue. This enables the secondary channel to work reliably, even if there is only a small difference in luminance between some of the different colors used for the secondary channel.

As outlined above, the pattern in FIG. 2 consists of 4 colors: Yellow, white, brown and black. These colors are used to create the secondary channel. One of the possible coding schemes is as follows:

For the secondary channel, let 0 be represented by a yellow or brown barcode element and 1 by a black or white barcode element. Using this representation, the three magnified codewords shown in FIG. 3 stand for:
Codeword 1:
1 Black, 2 Yellow, 1 Black, 5 White, 2 Brown, 1 White, 2 Black, 3 White
The sequence of one black block, two light grey blocks, 1 black block, 5 white blocks etc. can clearly be seen in the enlarged part of FIG. 3, corresponding to the color sequence listed above. This pattern is interpreted to stand for a codeword shown in binary form below:
10011111100111111
Codeword 2:
4 Black, 5 White, 1 Black, 1 Yellow, 1 Brown, 2 Yellow, 1 Black, 2 White=11111111110000111
Codeword 3:
1 Black, 3 White, 1 Brown, 5 Yellow, 1 Black, 1 Yellow, 4 Black, 1 White=11110000001011111

This coding technique allows each barcode element to define a bit value for the two channels independently, and there is no need for any correlation between the channels. Assuming the primary channel barcode treats black/brown as value 1, and white/yellow as value 0, this independence can be seen from the table below:

| First channel value | Second channel value | Color |
|---|---|---|
| 0 | 0 | yellow |
| 0 | 1 | white |
| 1 | 0 | brown |
| 1 | 1 | black |

Therefore, every codeword of the PDF417 barcode can carry an additional 17 bits. As data can be encoded in all pixels of the primary channel, all the pixels are said to belong to the encodeable region.

During the decoding process, the clock tracks (explained below) built into the primary channel enable the decoding of information for both the primary and secondary channel. This is because the same image units encode the primary and secondary channels.

The example above is only one possible encoding scheme. For example, colors other than yellow and brown may be used. It is also possible to encode the secondary channel using grey scales (for example as shown in FIG. 2 in which four different grey scales can be distinguished).

The example of using a PDF417 barcode as a primary channel is also not limiting. Primary channels using other formats such as Data Matrix or QR code can also support a secondary channel.

Suitable error detection/correction schemes can be used to improve ruggedness of the secondary channel.

A second example of embedding a secondary channel in a human readable primary channel is now explained with reference to FIG. 4.

This shows that a secondary channel may also be embedded in the print area carrying human readable material consisting of text, line drawings etc. Typical human readable material has a distribution of low luminance pixels (black) printed over high luminance pixels (white).

In the tables above, a high luminoscity yellow/white pixel encodes a first channel value of 0, and a low liminosity pixel black/brown pixel encodes a first channel value of 1. Of course opposite coding can be used.

The low luminance (black text) usually constitutes only 10% of total number of pixels. An example of encoding scheme can use the distribution of white pixels to encode the secondary channel. In this example of encoding scheme, information can be embedded in the primary channel only in certain regions. Therefore, the primary channel is divided into an encodeable region and a non-encodeable region.

Assuming each barcode element comprises a size of n×n pixels, the encodeable region consists of all square groups of n×n pixels with intensity level greater than a set threshold, while the non-encodeable region is the complement region of the encodeable region.

Therefore the encodeable region essentially consists of the white pixels while the non-encodeable region consists of the printed matter (human readable material).

The secondary channel is machine readable, and the individual elements will again be described as barcode elements, although it will be understood that the secondary channel is not encoded as a conventional barcode.

Using the same colors as in the example above for high luminance elements, information is encoded using yellow and white barcode elements (n×n pixels) such that yellow represents 0 and white represents 1. Information is encoded row-wise using the barcode elements in the encodeable region using the colors yellow and white. Non-encodeable regions that are sandwiched between the encodeable regions are ignored for the purposes of information embedding.

During the decode process, the bitmap is divided into an Information Carrying Region (ICR) and a Non Information carrying Region (NICR) depending on the luminance levels. The ICR is a set of n×n pixels with luminance level greater than a set threshold (this region will correspond to the encodeable region) while the NICR is the compliment region of the former.

Information is then retrieved from the ICR, ignoring all pixels that belong to NICR.

Figure 4:
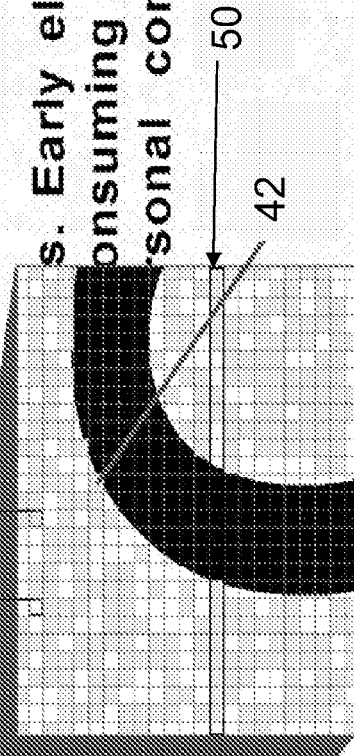
FIG. 4 shows a second example of image generated using an example of method of the invention.

To aid recovery of the secondary channel, clock tracks 40 can be laid around the border of the print area as illustrated in FIG. 4. These clock tracks divide the printable area into a number of segments thereby aiding the decode process of the secondary channel.

The clock track is printed using a suitable color such as black. The clock track essentially converts the document into a grid, each cell being the size of a barcode element.

Barcode Element 42 in FIG. 4 illustrates how a few pixels of a barcode element in the encodeable region can partially overwrite pixels originally occupied by human readable text, provided the mean luminosity of all pixels of the barcode element is greater than the set threshold (i.e. on average the n×n pixel area is sufficiently bright to be determined as background). In other words, when a n×n pixel block has been determined to be in the encodeable region, it will be encoded, and the resolution below the n×n pixel size is then lost.

The barcode element size thus needs to be selected in dependence on the resolution of the human readable image, so that the image cannot become unreadable as a result of this loss of resolution.

Figure 5:
FIG. 5 is used to explain how two information channels are encoded in the image of FIG. 4.

FIG. 5 shows a magnified view of the highlighted row 50 of cells from FIG. 4. This example encodes information as the following sequence of colors:
1 White, 8 Yellow, 7 Black, 2 White, 2 Yellow, 2 White, 5 Yellow Note that the barcode element 52 does not lose resolution as it is in the non-encodeable region.

Since the black barcode elements belong to NICR, these black pixels carry no information. Therefore, the information represented by the sequence of colors is as follows:
100000000xxxxxxx11001100000, where x represents no information.

Discarding the bits carrying no information, the following information is retrieved from the row:
10000000011001100000.

In this example, colors other than yellow can obviously be used. A different clocking scheme may be also be employed, and suitable error detection and correction schemes can also be used.

This second example again enables independent information channels to be encoded, and only introduces one additional color.

If the first channel is considered to encode 1 for black and 0 for white, the table of values for this example is as follows:

| First channel value | Second channel value | Color |
|---|---|---|
| 0 | 0 | Yellow |
| 0 | 1 | White |

| First channel value | Second channel value | Color |
|---|---|---|
| 1 | x | Black |
| 1 | x | Black |

It can be seen that the second channel is only encoded for parts of the first channel with a value 0 (i.e. image background).

For both examples above, the secondary channel is embedded in a document (irrespective of type of primary channel) as follows:

1. Obtain the primary channel. For example, the primary channel maybe a bitmap created from a suitable application on a PC or a scan of human readable material or 2D barcodes.

2. Utilize clock tracks in the primary channel, if necessary. For example, if the secondary channel is embedded in a primary channel of a standard barcode such as PDF417, it may not be necessary to introduce additional clock tracks, as the secondary channel can utilize the clock track of PDF417 itself. However, if the secondary channel is embedded in human readable text, explicit clock tracks may have to be provided. These ensure that the decoding of the image uses the same partition of the image which is assumed as part of the encoding process.

3. Modify the luminance and/or chrominance of pixels in the encodeable region, in order to create the secondary channel. This encodeable region may be the full image, and this then requires two additional colors or greyscales, or it may only be a part of the image, in which case only one additional color or greyscale may be required.

By creating a secondary channel, the primary channel is left substantially unaffected. For example, by encoding the secondary channel over human readable text, the readability is left unaffected. By encoding a secondary channel over a 2D barcode, the 2D barcode can be decoded by existing software and hardware implementations.

Therefore, the secondary channel offers interoperability with existing standards, while at the same time offering increased ruggedness and ability to carry supplementary information.

By creating a secondary channel over the primary information channel (human readable material and/or machine readable information), the information carrying area and hence the data carrying capacity of the paper document can be enhanced. It is also possible to utilize the secondary information channel to carry supplementary data such as formatting information. For example, when the primary information channel is a machine readable 2D barcode carrying XML data, the secondary channel can be used to carry the style sheet associated with the XML data.

In this example, those who do not retrieve the copy of the style sheet from the document may use appropriate style sheets retrieved from local storage. The secondary channel may also be used to provide information for boosting error detection/correction capability of the machine readable primary channel. If the secondary channel is embedded in human readable material (primary channel), it can carry disambiguation data to improve OCR for the primary channel.

The approach described above permits the use of internationally standardized protocols for creating the primary channel while at the same time offering additional information capacity by the use of the second channel.

In the examples above, the color is used to encode the secondary channel. As mentioned above, greyscale may instead be used. Furthermore, all that matters is that the information represented by an encoding element (e.g. block of pixels) of the primary channel is not altered by the secondary channel encoding. For example, in the case of a barcode as the primary channel, any secondary encoding can be used which does not change the way the symbol is interpreted by the barcode reader. For example, for a black barcode pixel, a white dot may be introduced in one of two positions within the encoding area, to encode a 0 or 1 of the secondary channel. Alternatively, a line may be introduced within a barcode element, with two possible orientations, lengths or widths. A barcode element may instead be given two possible patterns or shapes. There are many other possible secondary channel encoding schemes within the scope of the invention as claimed.

The reading device has not been described in detail, as conventional hardware can be used for this purpose. Barcode decoding comprises measuring brightness of image portions. A similar apparatus can be used for the secondary information channel when greyscale is used as the modulating parameter, or else color sensing can be used if color modulation is used.

Of course, the image processing needs to be able to decode the secondary channel information, and this may require color sensing, brightness detection, or pattern recognition.

The description above uses the term "channel" for both information streams. As has been explained, the term "information channel" covers either human readable information or machine readable information. The information channels can relate to an image, and particularly a human readable image such as text, and the term should be understood accordingly.

While specific embodiments have been described herein for purposes of illustration, various modifications will be apparent to a person skilled in the art and may be made without departing from the scope of the invention as claimed.

We claim:

1. A method of independently encoding an image with two information channels, comprising:
   generating an image which encodes a primary information channel, the image comprising image portions, wherein the image portions are generated as an image portion with brightness above a first threshold, or as an image portion with brightness below a second threshold, the brightness levels encoding the primary information channel; and
   modifying the image to encode a secondary information channel, wherein the image modification is applied to at least some of the image portions and comprises applying one of two image output values to the image portion, wherein the brightness of a modified image portion is not changed such as to cross the first or second thresholds, wherein the image output values are used to encode the secondary information channel.

2. A method as claimed in claim 1, wherein modifying the image comprises applying one of two brightness levels to an image portion.

3. A method as claimed in claim 1, wherein modifying the image comprises applying one of two colors to an image portion.

4. A method as claimed in claim 3, wherein the two colors to be used for image modification of an image portion depend on the primary information channel data encoded by the image portion.

5. A method as claimed in claim 3, wherein for modifying an image portion having a brightness level above the first threshold, the modification comprises selecting white or another color with brightness above the first threshold, for example yellow.

6. A method as claimed in claim 3, wherein for modifying an image portion having a brightness level below the first threshold, the modification comprises selecting black or another color with brightness below the second threshold, for example brown.

7. A method as claimed in claim 1, wherein the image is machine readable to decode the primary information channel.

8. A method as claimed in claim 7, wherein the image encoding the primary information channel comprises a barcode.

9. A method as claimed in claim 8, wherein the image encoding the primary information channel comprises a PDF417 barcode.

10. A method as claimed in claim 1, wherein the image is human readable to decode the primary information channel.

11. A method as claimed in claim 10, wherein the image encoding the primary information channel comprises text.

12. A method as claimed in claim 1, wherein the image is machine readable to decode the secondary information channel.

13. A method as claimed in claim 1, wherein the image modification is applied to image portions with brightness above the first threshold and to image portions with brightness below the second threshold.

14. A method as claimed in claim 1, wherein the image modification is applied only to image portions with brightness above the first threshold.

15. A method as claimed in claim 1, wherein the image comprises markings defining the division of the image into the image portions.

16. A non-transitory computer readable medium including machine readable instructions that when executed by a computer perform encoding an image with two information channels, the instructions comprising instructions to:
   generate an image which encodes a primary information channel, the image comprising image portions, wherein the image portions are generated as an image portion with brightness above a first threshold, or as an image portion with brightness below a second threshold, the brightness levels encoding the primary information channel; and
   modify the image to encode a secondary information channel, wherein the image modification is applied to at least some of the image portions and comprises applying one of two image output values to the image portion, wherein the brightness of a modified image portion is not changed such as to cross the first or second thresholds, wherein the image output values are used to encode the secondary information channel.

17. A non-transitory computer readable medium as recited in claim 16 wherein the instructions to modify the image comprise instructions to apply one of two brightness levels to an image portion.

18. Apparatus for decoding an image which comprises:
   image portions, wherein the image portions comprise a first set of image portions with brightness above a first threshold, and a second set of image portions with brightness below a second threshold, the brightness levels encoding the primary information channel; and
   wherein at least some of the image portions encode a secondary information channel, and each comprise one of two image output values, wherein the two image output values are such that the brightness of an image portion when modified to one of the two image output values is not changed such as to cross the first or second thresholds,
   wherein the apparatus comprises means for decoding the primary information channel based on the brightness levels of the image portions, and means for decoding the secondary information channel by analysing the output values.

* * * * *